(12) United States Patent
Kim et al.

(10) Patent No.: US 9,786,237 B2
(45) Date of Patent: Oct. 10, 2017

(54) LIQUID CRYSTAL DISPLAY

(71) Applicant: Samsung Display Co., Ltd., Yongin (KR)

(72) Inventors: Kwi Hyun Kim, Yongin-si (KR); Jae-Yong Shin, Asan-si (KR); Jae-Ho Choi, Seoul (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 14/550,556

(22) Filed: Nov. 21, 2014

(65) Prior Publication Data

US 2015/0185533 A1    Jul. 2, 2015

(30) Foreign Application Priority Data

Dec. 31, 2013 (KR) .................. 10-2013-0169363

(51) Int. Cl.
   *G02F 1/1362*   (2006.01)
   *G09G 3/36*     (2006.01)
   *G02F 1/1343*   (2006.01)

(52) U.S. Cl.
   CPC ..... *G09G 3/3648* (2013.01); *G02F 1/136213* (2013.01); *G02F 2001/134345* (2013.01); *G09G 2300/0447* (2013.01)

(58) Field of Classification Search
   CPC ...... G09G 3/3648; G09G 3/36; G02F 1/1362; G02F 1/136213; G02F 1/13624; G02F 1/13452; G02F 1/1343; G02F 1/133753; G02F 1/136327; G02F 1/134336; G02F 1/13628; G02F 2001/134345; G02F 2001/134354
   See application file for complete search history.

(56) References Cited

U.S. PATENT DOCUMENTS

| 5,818,172 | A | 10/1998 | Lee |
| 5,825,343 | A | 10/1998 | Moon |
| 8,514,162 | B2 * | 8/2013 | Moh .................... G09G 3/3655 345/94 |
| 9,087,490 | B2 * | 7/2015 | Kim .................... G09G 3/3648 |

(Continued)

FOREIGN PATENT DOCUMENTS

| JP | 2012220594 | 11/2012 |
| KR | 101140165 | 4/2012 |

(Continued)

*Primary Examiner* — Jennifer Mehmood
*Assistant Examiner* — Sardis F Azongha
(74) *Attorney, Agent, or Firm* — Cantor Colburn LLP

(57) ABSTRACT

A liquid crystal display includes: a substrate; a gate line disposed on the substrate; a storage voltage line disposed on the substrate and extending substantially parallel to the gate line; a data line disposed on the substrate; a reference voltage line disposed on the substrate and extending substantially parallel to the data line; first and second subpixel electrodes disposed in a pixel area; a first switching element connected to the gate line, the data line, and the first subpixel electrode; a second switching element connected to the gate line, the data line, and the second subpixel electrode; and a third switching element connected to the second subpixel electrode and the reference voltage line, wherein the storage voltage line and the reference voltage line are not connected to each other.

10 Claims, 6 Drawing Sheets

(56) References Cited

U.S. PATENT DOCUMENTS

| | | | |
|---|---|---|---|
| 2006/0244704 A1* | 11/2006 | JaeHun | G09G 3/3655 345/92 |
| 2007/0024565 A1* | 2/2007 | Choi | G09G 3/3655 345/98 |
| 2010/0039452 A1 | 2/2010 | Park et al. | |
| 2010/0201669 A1* | 8/2010 | Kim | G09G 3/3648 345/211 |
| 2012/0033001 A1* | 2/2012 | Kim | G09G 3/3659 345/697 |
| 2012/0320019 A1 | 12/2012 | Jeong et al. | |
| 2013/0242239 A1 | 9/2013 | Chang et al. | |

FOREIGN PATENT DOCUMENTS

| | | |
|---|---|---|
| KR | 101212168 | 12/2012 |
| KR | 101277937 | 6/2013 |

\* cited by examiner

LIQUID CRYSTAL DISPLAY

This application claims priority to Korean Patent Application No. 10-2013-0169363 filed on Dec. 31, 2013, and all the benefits accruing therefrom under 35 U.S.C. §119, the content of which in its entirety is herein incorporated by reference.

BACKGROUND (a) Field

Exemplary embodiments of the invention relates to a liquid crystal display.

(b) Description of the Related Art

An liquid crystal display ("LCD") is one of the most widely used types of flat panel display, and the LCD typically includes two panels provided with field-generating electrodes, such as pixel electrodes and a common electrode, and a liquid crystal ("LC") layer interposed between the two panels. The LCD displays images by applying voltages to the field-generating electrodes to generate an electric field in the LC layer that determines the orientations of LC molecules therein to adjust polarization of light incident thereto.

Among the LCDs, a vertical alignment ("VA") mode LCD, in which longitudinal axes of LC molecules are arranged perpendicular to the panels in the absence of an electric field, is spotlighted because of its high contrast ratio and wide reference viewing angle. Here, the reference viewing angle refers to a viewing angle at which a contrast ratio is 1:10 or a luminance inversion limit angle between grayscales.

In the VA mode LCD, a method of realizing a difference in transmittance from various directions by dividing one pixel into two sub-pixels and applying different voltages to the two sub-pixels by lowering a voltage of one pixel has been suggested to allow side visibility to be substantially close to front visibility. Particularly, among the method of realizing the difference in transmittance by dividing one pixel into two sub-pixels and applying the different voltages to the two sub-pixels by lowering the voltage of one pixel, a method of dividing the data voltage has been suggested.

SUMMARY

In a method dividing the data voltage to apply different voltages to two sub-pixels, when the voltage applied to the wiring to apply a divided reference voltage and a storage voltage forming a storage capacitor have the same magnitude, the data voltage may not be effectively precisely divided such that expression of a correct grayscale may not be effectively performed. Also, when the size of the liquid crystal display is increased, the length of wiring to apply the voltage is increased such that resistance of the wiring is increased and the magnitude of the applied voltage may not be uniform on the whole liquid crystal display, thereby causing display deterioration.

Exemplary embodiments of the invention relate to a liquid crystal display preventing display quality deterioration such as luminance deterioration and equally maintaining magnitudes of a divided reference voltage and a storage voltage while side visibility is close to front visibility.

An exemplary embodiment of a liquid crystal display according to the invention includes: a substrate; a gate line disposed on the substrate; a storage voltage line disposed on the substrate and extending substantially parallel to the gate line; a data line disposed on the substrate; a reference voltage line disposed on the substrate and substantially parallel to the data line; a first subpixel electrode disposed in a pixel area; a second subpixel electrode disposed in the pixel area; a first switching element connected to the gate line, the data line, and the first subpixel electrode; a second switching element connected to the gate line, the data line, and the second subpixel electrode; and a third switching element connected to the second subpixel electrode and the reference voltage line, where the storage voltage line and the reference voltage line are not connected to each other.

In an exemplary embodiment, the third switching element may be connected to the gate line.

In an exemplary embodiment, the storage voltage line may include a first storage electrode overlapping the first subpixel electrode and a second storage electrode overlapping the second subpixel electrode.

In an exemplary embodiment, the liquid crystal display may further include a first signal compensation unit connected to the reference voltage line via a first connection line and a second connection line and a second signal compensation unit connected to the storage voltage line via a third connection line and a fourth connection line.

In an exemplary embodiment, the first signal compensation unit may receive a reference voltage from the reference voltage line through the first connection line, and the first signal compensation unit may apply a first compensation signal to the reference voltage line through the second connection line.

In an exemplary embodiment, the second signal compensation unit may receive a storage voltage from the storage voltage line through the third connection line, and the second signal compensation unit may apply a second compensation signal to the storage voltage line through the fourth connection line.

According to exemplary embodiments of the liquid crystal display according to the invention, while side visibility is close to front visibility, the magnitude of the divided reference voltage is different from the magnitude of the storage voltage, and the display quality deterioration such as luminance deterioration is thereby effectively prevented.

BRIEF DESCRIPTION OF THE DRAWINGS

The above and other features of the invention will become more apparent by describing in further detail exemplary embodiments thereof with reference to the accompanying drawings, in which.

DETAILED DESCRIPTION

Figure 1:
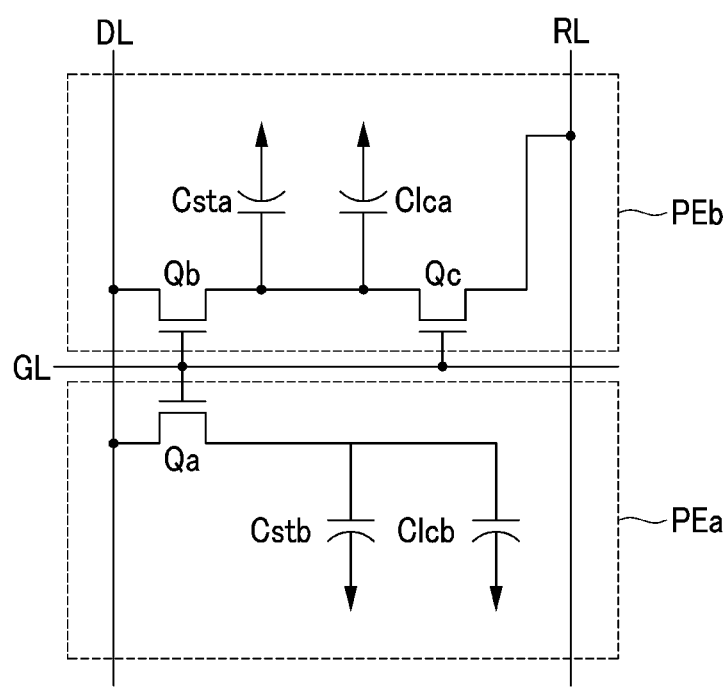
FIG. 1 is an equivalent circuit diagram showing an exemplary embodiment of a liquid crystal display according to the invention.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, exemplary embodiments of the invention will be described in detail with reference to accompanying drawings.

Firstly, an arrangement of a signal line in an exemplary embodiment of a liquid crystal display according to the invention and an exemplary embodiment of a driving method thereof in the liquid crystal display will be described with reference to FIG. 1. FIG. 1 is an equivalent circuit diagram of an exemplary embodiment of a liquid crystal display according to the invention.

Referring to FIG. 1, a pixel of an exemplary embodiment of a liquid crystal display includes a plurality of signal lines including a gate line GL for transmitting a gate signal, a data line DL for transmitting a data signal and a divided reference voltage line RL for transmitting a divided reference voltage, and further includes a first switching element Qa, a second switching element Qb, a third switching element Qc, a first liquid crystal capacitor Clca, a second liquid crystal capacitor Clcb, a first storage capacitor Csta, and a second storage capacitor Cstb, which are connected to the plurality of signal lines.

Each of the first switching element Qa and the second switching element Qb is connected to the gate line GL and the data line DL, and the third switching element Qc is connected to the gate line GL, the divided reference voltage line RL and an output terminal of the first liquid crystal capacitor Clca.

The first switching element Qa and the second switching element Qb correspond to a three-terminal element such as a thin film transistor, and control terminals thereof are connected to the gate line GL, input terminals thereof are connected to the data line DL, an output terminal of the first switching element Qa is connected to the first liquid crystal capacitor Clca, and an output terminal of the second switching element Qb is connected to the second liquid crystal capacitor Clcb and an input terminal of the third switching element Qc.

The third switching element Qc corresponds to a three-terminal element such as a thin film transistor, and a control terminal thereof is connected to the gate line GL, an input terminal thereof is connected to the second liquid crystal capacitor Clcb, and an output terminal thereof is connected to the divided voltage reference voltage line RL.

In such an embodiment, when a gate-on signal is applied to the gate line GL, the first switching element Qa, the second switching element Qb and the third switching element Qc, which are connected to the gate line GL, are turned on. Accordingly, data voltages transmitted through the data line DL are applied to a first sub-pixel electrode PEa and a second sub-pixel electrode PEb through the turned-on first switching element Qa and second switching element Qb. When the data voltages are applied to the first sub-pixel electrode PEa and the second sub-pixel electrode PEb, the data voltages applied to the first subpixel electrode PEa and the second subpixel electrode PEb are substantially the same as each other, and the first liquid crystal capacitor Clca and the second liquid crystal capacitor Clcb are charged at substantially a same value based on a difference between the common voltage and the data voltage. Simultaneously, the charged voltage in the second liquid crystal capacitor Clcb is divided through the turned-on third switching element Qc. As a result, a charged voltage value in the second liquid crystal capacitor Clcb is decreased by a difference between the common voltage and the divided reference voltage, such that the charged voltage in the first liquid crystal capacitor Clca is higher than the charged voltage in the second liquid crystal capacitor Clcb.

In such an embodiment, as described above, the charged voltage in the first liquid crystal capacitor Clca and the charged voltage in the second liquid crystal capacitor Clcb are different from each other. The voltage of the first liquid crystal capacitor Clca and the voltage of the second liquid crystal capacitor Clcb are different from each other such that tilt angles of liquid crystal molecules in the first subpixel and the second subpixel are different from each other, and as a result, luminance of the two subpixels become different from each other. Accordingly, in such an embodiment, the voltage of the first liquid crystal capacitor Clca and the voltage of the second liquid crystal capacitor Clcb may be controlled to allow an image viewed from the side to be maximally close to an image viewed from the front, thereby improving side visibility.

In an exemplary embodiment, two terminals of the first storage capacitor Csta may be defined by the output terminal of the first switching element Qa and a first storage electrode of a storage voltage line (not shown). In such an embodiment, two terminals of the second storage capacitor Cstb may be defined by the output terminal of the second switching element Qb and a second storage electrode of the storage voltage line.

The first storage capacitor Csta and the second storage capacitor Cstb may reinforce and maintain a storage capacitance of the first liquid crystal capacitor Clca and the second liquid crystal capacitor Clcb, respectively.

The first storage electrode and the second storage electrode that define one terminal of the first storage capacitor Csta and the second storage capacitor Cstb, respectively, are applied with a voltage substantially the same magnitude as a common voltage applied to a common electrode from the storage voltage line.

According to an exemplary embodiment of the liquid crystal display according to the invention, the storage voltage line including the first storage electrode and the second storage electrode, and the divided reference voltage line RL are separated from (e.g., disconnected from) each other and are independently provided, e.g., formed. Accordingly, in such an embodiment, the storage voltage line is applied with the storage voltage of substantially the same magnitude as the common voltage of the common electrode, and the divided reference voltage line RL is applied with a step-up reference voltage. The storage voltage and the step-up reference voltage have different magnitudes from each other.

Figure 2:
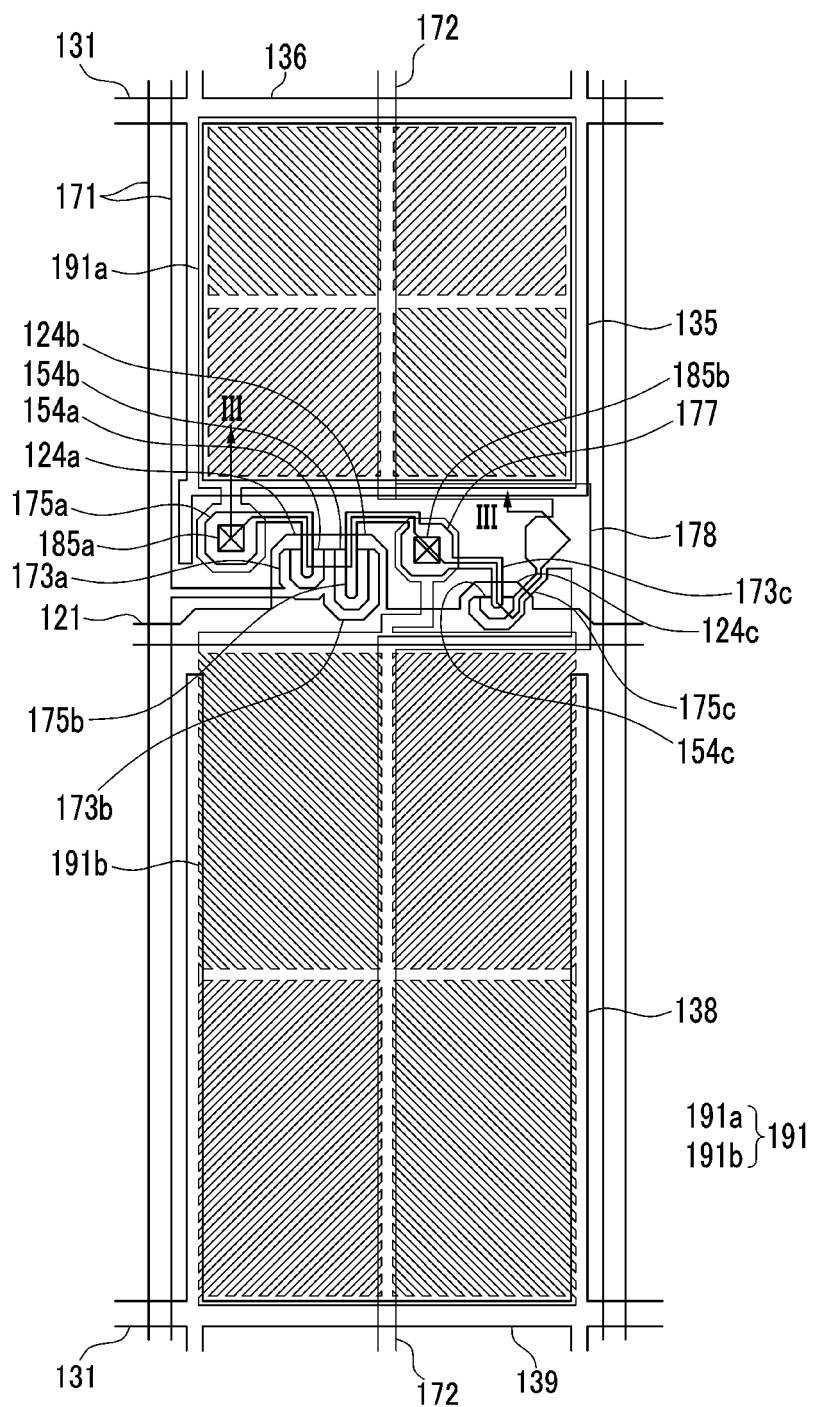
FIG. 2 is a plan view of an exemplary embodiment of a liquid crystal display according to the invention.

Next, an exemplary embodiment of a liquid crystal display according to the invention will be described in greater detail with reference to FIG. 2 and FIG. 3. FIG. 2 is a plan view of an exemplary embodiment of a liquid crystal display according to the invention, and FIG. 3 is a cross-sectional view taken along line III-III of the liquid crystal display of FIG. 2.

Figure 3:
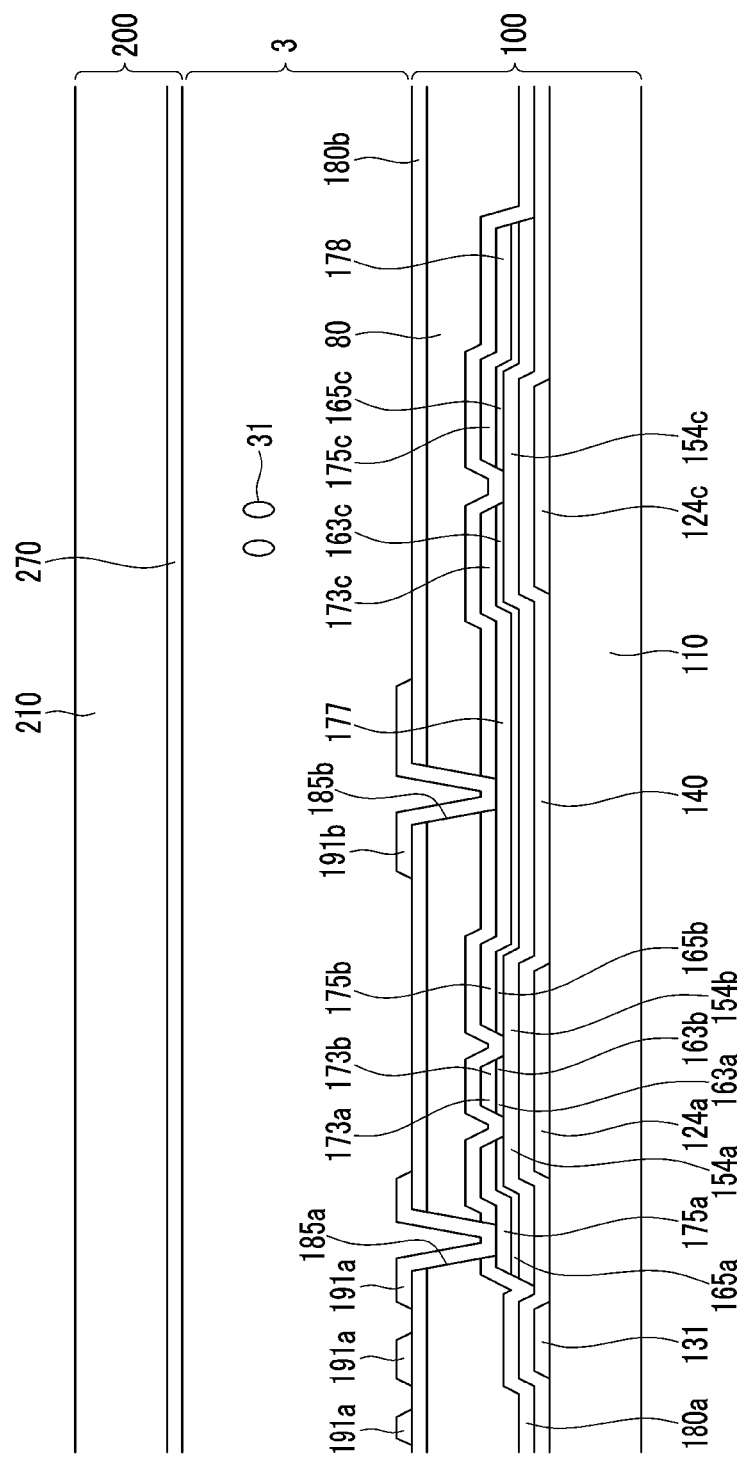
FIG. 3 is a cross-sectional view taken along line III-III of the liquid crystal display of FIG. 2.

Referring to FIG. 2 and FIG. 3, an exemplary embodiment of the liquid crystal display according to the invention includes a lower panel 100 and an upper panel 200 which are disposed opposite to each other, and a liquid crystal layer 3 interposed between the lower and upper panels 100 and 200.

First, the lower panel 100 will be described in detail.

The lower panel includes a first insulation substrate 110, and a gate conductor including a plurality of gate lines 121 and a plurality of storage voltage lines 131, which are disposed on the first insulation substrate 110.

The gate line 121 transfers a gate signal, and includes a first gate electrode 124a, a second gate electrode 124b and a third gate electrode 124c.

The storage voltage line 131 includes a first storage electrode (135 and 136) and a second storage electrode (138 and 139).

The gate line 121 and the storage voltage line 131 extend substantially parallel to each other.

A gate insulating layer 140 is disposed on the gate line 121 and the storage voltage line 131.

A first semiconductor 154a, a second semiconductor 154b and a third semiconductor 154c are disposed on the gate insulating layer 140.

Ohmic contacts 163a, 165a, 163b, 165b, 163c and 165c are disposed on the first semiconductor 154a, the second semiconductor 154b and the third semiconductor 154c. In an exemplary embodiment, the semiconductors 154a, 154b and 154c may include an oxide semiconductor, and in such an embodiment, the ohmic contacts may be omitted.

A data conductor is disposed on the ohmic contacts 163a, 165a, 163b, 165b, 163c and 165c, and the gate insulating layer 140. The data conductor includes a data line 171 including a first source electrode 173a and a second source electrode 173b, a divided reference voltage line 172 including a third drain electrode 175c, a first drain electrode 175a, a second drain electrode 175b and a third source electrode 173c. The second drain electrode 175b includes a drain expansion 177, and the second drain electrode 175b and the third drain electrode 175c are connected to each other via the drain expansion 177.

The data line 171 and the divided reference voltage line 172 extend substantially parallel to each other.

The divided reference voltage line 172 is disposed between two adjacent data lines 171, and includes a longitudinal part substantially parallel to the data line 171 and a transverse connection part including an expansion 178 extending from the longitudinal part and connected to the third source electrode 173c.

The data conductor and the underlying semiconductor and ohmic contacts may be simultaneously provided, e.g., formed, using a same mask, e.g., a single mask.

The data line 171 has an end portion (not shown) having a wide area for connection to other layers or an external driving circuit.

The first gate electrode 124a, the first source electrode 173a and the first drain electrode 175a collectively define a first thin film transistor, e.g., a first switching element Qa, along with the first semiconductor 154a. A channel of the first thin film transistor Qa is formed in the first semiconductor 154a between the first source electrode 173a and the first drain electrode 175a. Similarly, the second gate electrode 124b, the second source electrode 173b and the second drain electrode 175b collectively define a second thin film transistor, e.g., a second switching element Qb, along with the second semiconductor 154b. The channel of the second thin film transistor is formed in the second semiconductor 154b between the second source electrode 173b and the second drain electrode 175b, and the third gate electrode 124c, the third source electrode 173c and the third drain electrode 175c collectively define a third thin film transistor, e.g., a third switching element Qc, along with the third semiconductor 154c. The channel of the third thin film transistor is formed in the semiconductor 154c between the third source electrode 173c and the third drain electrode 175c.

A first passivation layer 180a is disposed on the data conductor. The first passivation layer 180a may include an inorganic insulator or an organic insulator.

An organic layer 80 is disposed on the first passivation layer 180a. The organic layer 80 has a thickness greater than a thickness of the first passivation layer 180a and may have a flat surface. The organic layer 80 may be a color filter.

A second passivation layer 180b is disposed on the organic layer 80. The second passivation layer 180b may include the inorganic insulator or the organic insulator. In an alternative exemplary embodiment, the second passivation layer 180b may be omitted.

The second passivation layer 180b may include an inorganic insulating material such as a silicon nitride or a silicon oxide, for example. The second passivation layer 180b effectively prevents peeling of the color filter and suppresses contamination of the liquid crystal layer 3 by an organic material of the solvent that inflows from the color filter in an exemplary embodiment where the organic layer 80 is the color filter, such that defects that may occur when an image is driven, such as afterimages, is effectively prevented.

In such an embodiment, a first contact hole 185a and a second contact hole 185b for exposing the first drain electrode 175a and the drain expansion 177 of the second drain electrode 175b may be defined through the first passivation layer 180a, the organic layer 80 and the second passivation layer 180b.

A plurality of pixel electrodes 191 is disposed on the second passivation layer 180b. Each pixel electrode 191 includes a first subpixel electrode 191a and a second subpixel electrode 191b which are separated from each other with the gate line 121 therebetween to extend together in a column direction based on the gate line 121. The pixel electrode 191 may include or be made of a transparent material such as indium tin oxide ("ITO") or indium zinc oxide ("IZO"), for example. The pixel electrode 191 may include or be made of a transparent conductive material such as ITO or IZO, or a reflective metal such as aluminum, silver, chromium, or an alloy thereof, for example.

Figure 4:
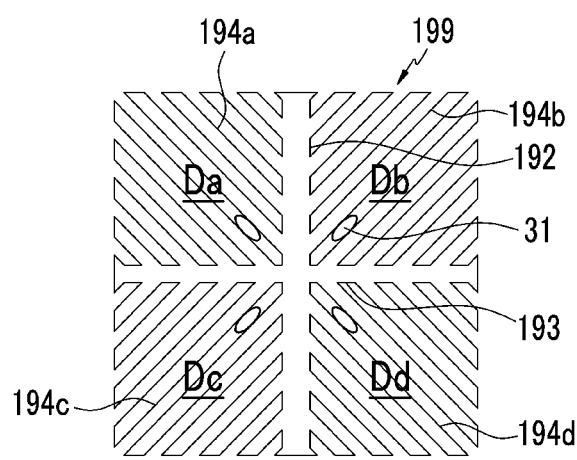
FIG. 4 is a view of a unit electrode of an exemplary embodiment of a liquid crystal display according to the invention.

In one exemplary embodiment, for example, each of the first subpixel electrode 191a and the second subpixel electrode 191b may include a single unit electrode 199, as shown in FIG. 4.

In an exemplary embodiment, the first subpixel electrode 191a and the second subpixel electrode 191b are physically and electrically connected to the first drain electrode 175a and the second drain electrode 175b through the first contact hole 185a and the second contact hole 185b, respectively, thereby respectively receiving data voltages from the first drain electrode 175a and the second drain electrode 175b. In such an embodiment, a part of the data voltage applied to the second drain electrode 175b is divided through the third source electrode 173c, such that the magnitude of the voltage applied to the first subpixel electrode 191a is greater than the magnitude of the voltage applied to the second subpixel electrode 191b.

The first subpixel electrode 191a and the second subpixel electrode 191b, to which the data voltages are applied, generate an electric field together with the common electrode 270 of the upper panel 200 to determine alignment directions of the liquid crystal molecules 31 of the liquid crystal layer 3 between the pixel and common electrodes 191 and 270. Luminance of light passing through the liquid crystal layer 3 is controlled based on the determined directions of the liquid crystal molecules.

The first subpixel electrode 191a and the first storage electrode (135 and 136) overlap each other, thereby forming the first storage capacitor Csta, and the second subpixel electrode 191b and the second storage electrode (138 and 139) overlap each other, thereby forming the second storage capacitor Cstb.

The storage voltage line 131 and the first storage electrode (135 and 136) and the second storage electrode (138 and 139) extending from the storage voltage line 131 form the storage capacitor, and may function as a light blocking member, thereby effectively preventing light leakage that may be generated between the adjacent pixel areas, and between the pixel electrode and the data line.

Now, the upper display panel 200 will be described.

In an exemplary embodiment, the upper display panel 200 includes a second insulation substrate 210, and the common electrode 270 disposed on the second insulation substrate 210. In such an embodiment, an upper alignment layer (not shown) may be disposed on the common electrode 270. The upper alignment layer may be a vertical alignment layer.

The liquid crystal layer 3 has negative dielectric anisotropy, and liquid crystal molecules 31 of the liquid crystal layer 3 are aligned so that longitudinal axes of the liquid crystal molecules are substantially perpendicular to the surfaces of the lower and upper display panels 100 and 200 in a state where no electric field is generated therein.

Now, referring to FIG. 4, a unit electrode 199 will be described. In an exemplary embodiment, as shown in FIG. 4, the unit electrode 199 is in a substantially quadrangular shape, and the unit electrode 199 includes a cross-shaped stem having a transverse stem 193 and a longitudinal stem 192 that cross each other. In such an embodiment, the unit electrode 199 is divided into a first sub-region Da, a second sub-region Db, a third sub-region Dc and a fourth sub-region Dd by the transverse stem 193 and the longitudinal stem 192, and the first to fourth sub-regions Da-Dd include a plurality of first minute branches 194a, a plurality of second minute branches 194b, a plurality of third minute branches 194c, and a plurality of fourth minute branches 194d, respectively.

The first minute branches 194a obliquely extend from the transverse stem 193 or the longitudinal stem 192 in the upper-left direction, and the second minute branches 194b obliquely extend from the transverse stem 193 or the longitudinal stem 192 in the upper-right direction. The third minute branches 194c obliquely extend from the transverse stem 193 or the longitudinal stem 192 in the lower-left direction, and the fourth minute branches 194d obliquely extend from the transverse stem 193 or the longitudinal stem 192 in the lower-right direction.

The first to fourth minute branches 194a-194d form an angle of about 45 degrees or 135 degrees with the gate lines 121a and 121b or the transverse stem 193. Also, the minute branches 194a-194d of two neighboring sub-regions Da-Dd may cross each other.

In such an embodiment, when the first subpixel electrode 191a and the second subpixel electrode 191b are applied with the voltage and an electric field is thereby generated between the common electrode 270, and the first and second subpixel electrodes 191a and 191b, a horizontal component that determines an inclined direction of the liquid crystal molecules 31 is generated by edges of the first to fourth minute branches 194a, 194b, 194c and 194d. The horizontal component of the electric field is substantially parallel to the edges of the first to fourth minute branches 194a-194d. Accordingly, as shown in FIG. 4, the liquid crystal molecules 31 are inclined in the direction substantially parallel to the length direction of the minute branches 194a-194d. Each sub pixel electrode 191a or 191b includes the four sub-regions Da to Dd, in which the longitudinal directions of the minute branches 194a, 194b, 194c and 194d are different from each other, such that the liquid crystal molecules 31 are inclined in four directions, and four domains in which the alignment directions of the liquid crystal molecules 31 are different from each other are defined on the liquid crystal layer 3. As described above, in such an embodiment, the liquid crystal molecules corresponding to a subpixel electrode are inclined in various directions, such that a reference viewing angle of the liquid crystal display is increased.

Figure 5:
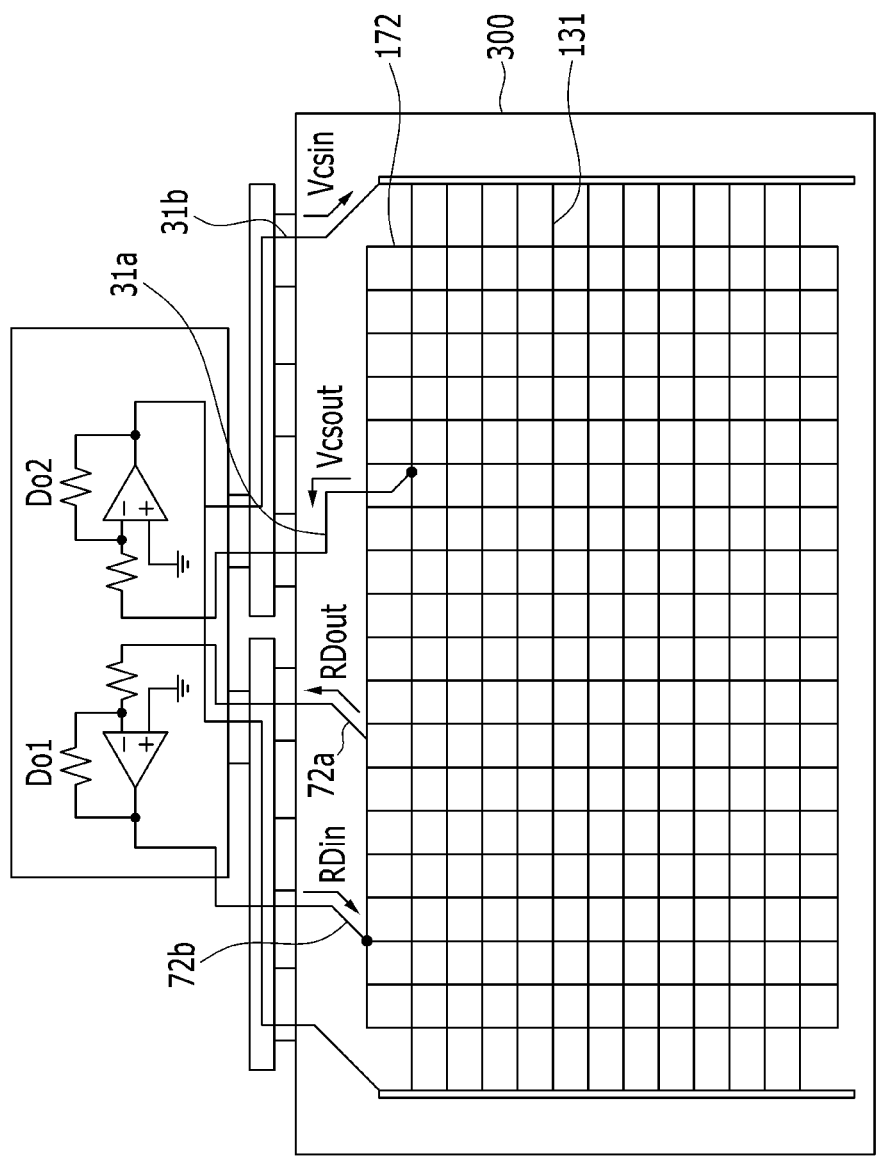
FIG. 5 is a schematic view of a part of signal lines and a signal compensation unit in an exemplary embodiment of a liquid crystal display according to the invention.

Next, a signal line and a signal compensation unit of an exemplary embodiment of a liquid crystal display according to the invention will be described with reference to FIG. 5 along with FIG. 1 to FIG. 3. FIG. 5 is a schematic view of a part of signal lines and a signal compensation unit in an exemplary embodiment of a liquid crystal display according to the invention.

Referring to FIG. 5, in an exemplary embodiment, a divided reference voltage line 172 extending substantially parallel to the data line 171 is connected to a first signal compensation unit Do1, and a storage voltage line 131 extending substantially parallel to the gate line 121 is connected to a second signal compensation unit Do2.

In such an embodiment, parts of the divided reference voltage line 172 are connected to each other, and the signal applied to the divided reference voltage line 172 is applied to the first signal compensation unit Do1 through a first connection line 72a connected to the first signal compensation unit Do1 (RDout). In such an embodiment, the first signal compensation unit Do1 selectively outputs a first compensation signal to a second connection line 72b (RDin) based on whether a magnitude of the divided reference voltage is changed or is less than a predetermined magnitude, using an amplifier. In one exemplary embodiment, for example, when a compensation of the divided reference voltage is performed in such as a case that the magnitude of the divided reference voltage is decreased under the display panel 300 of the liquid crystal display by a resistance of the divided reference voltage line 172, the first compensation signal is applied in the first signal compensation unit Do1 to perform such a compensation.

In an exemplary embodiment, the storage voltage line 131 is connected to a storage voltage pad part, the storage voltage applied to the storage voltage line 131 is applied to the second signal compensation unit Do2 through a third connection line 31a connected to the second signal compensation unit Do2 (Vcsout). In such an embodiment, the second signal compensation unit Do2 selectively applies a second compensation signal to a fourth connection line 31b (Vcsin) based on whether the magnitude of the storage voltage is changed or is less than a predetermined magnitude, using an amplifier. In one exemplary embodiment, for example, when a compensation of the storage voltage is performed in such as a case that a parasitic capacitance is generated at a position where the storage electrode and the divided reference voltage line 172 overlap each other such that the magnitude of the storage voltage transmitted through the storage voltage line 131 is changed, or the magnitude of the storage voltage is decreased at the center of the display panel 300 of the liquid crystal display by the resistance of the storage voltage line 131, the second compensation is applied in the second signal compensation unit Do2 to perform such a compensation.

In an exemplary embodiment, the first signal compensation unit Do1 and the second signal compensation unit Do2 may be variously configured.

As described above, according to an exemplary embodiment of the liquid crystal display according to the invention, the divided reference voltage line 172 applied with the divided reference voltage affected by the voltage of the second subpixel electrode 191b and the storage voltage line 131 including the storage electrode forming the storage capacitor are disposed in different layers, and the voltages of the different magnitudes are applied such that the magnitude of the voltage of the pixel electrode may be effectively correctly maintained, thereby increasing display quality. In such an embodiment, the storage capacitance of the storage capacitor may be maintained to be high by maintaining the different magnitudes of the divided reference voltage and the storage voltage.

In a conventional liquid crystal display, the divided reference voltage line and the storage voltage line are typically connected to each other such that the same voltage is applied, and the magnitude of the storage voltage is thereby changed based on the magnitude change of the divided reference voltage, and the magnitude of the divided reference voltage is further largely changed based on the magnitude change of the storage voltage. Accordingly, display quality deterioration such as flickering for each pixel area and luminance deterioration may occur in such a conventional liquid crystal display.

According to an exemplary embodiment of the liquid crystal display according to the invention, the divided reference voltage line and the storage voltage line are not connected to each other, and a voltage of a predetermined magnitude is applied independently of each other, thereby effectively preventing the display quality deterioration. In such an embodiment, of the liquid crystal display includes the first signal compensation unit and the second signal compensation unit which are connected to the divided reference voltage line and the storage voltage line and each applies the compensation signal to the divided reference voltage and the storage voltage such that the voltage magnitude of the pixel electrode may be effectively maintained and the capacitance of the storage capacitor may be substantially uniformly maintained, thereby increasing the display quality.

Figure 6:
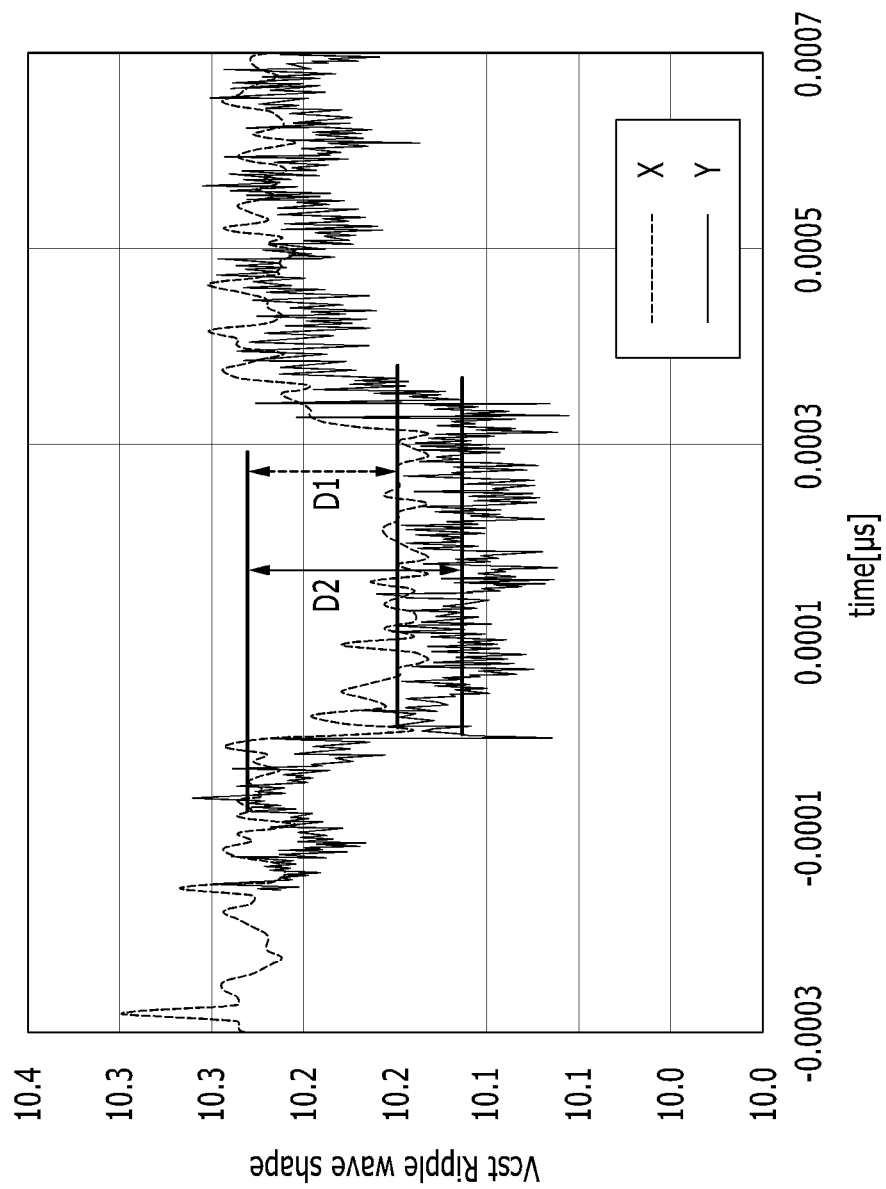
FIG. 6 is a waveform diagram showing a result of an experiment on an exemplary embodiment of a liquid crystal display according to the invention.

Next, an experiment on an exemplary embodiment of the invention will be described with reference to FIG. 6. FIG. 6 is a waveform diagram showing a result of an experiment on an exemplary embodiment of the invention.

In the experiment, a waveform change of the divided reference voltage in an exemplary embodiment of a liquid crystal display according to the invention (X), in which the divided reference voltage line and the storage voltage line are separately provided and are not connected to each other, and a waveform change of the divided reference voltage in a conventional liquid crystal display (Y) in which the divided reference voltage line and the storage voltage line are connected to each other to be applied with the voltage of the same magnitude, are measured as shown in FIG. 6.

Referring to FIG. 6, after the divided reference voltage is applied, the magnitude of the divided reference voltage is changed during a time of about 0.0001 microsecond (μs) to about 0.0003 μs and when comparing a decreased magnitude, a first change amount D1 of an exemplary embodiment of the invention (X) in which the divided reference voltage line and the storage voltage line are separately provided and are not connected to each other is smaller than a first change amount D2 of the conventional liquid crystal display (Y) in which the divided reference voltage line and the storage voltage line are connected to be applied with the voltage of the same magnitude.

Accordingly, as shown in FIG. 6, in an exemplary embodiment of the liquid crystal display according to the invention, where the divided reference voltage line and the storage voltage line are separately provided and are not connected to each other, when the voltage of a predetermined magnitude is applied, a magnitude of a ripple of the divided reference voltage may be reduced.

While the invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A liquid crystal display comprising:
   a substrate;
   a gate line disposed on the substrate;
   a storage voltage line disposed on the substrate and extending substantially parallel to the gate line;
   a data line disposed on the substrate;
   a reference voltage line disposed on the substrate and extending substantially parallel to the data line;
   a first subpixel electrode disposed in a pixel area;
   a second subpixel electrode disposed in the pixel area;
   a first switching element connected to the gate line, the data line and the first subpixel electrode;
   a second switching element connected to the gate line, the data line and the second subpixel electrode;
   a third switching element connected to the second subpixel electrode and the reference voltage line;
   a first signal compensation unit connected to the reference voltage line via a first connection line and a second connection line; and
   a second signal compensation unit connected to the storage voltage line via a third connection line and a fourth connection line,
   wherein the storage voltage line and the reference voltage line are not connected to each other, and
   wherein the first signal compensation unit and the second signal compensation unit are not connected to each other, and voltages of different predetermined magnitudes are applied independently of each other to the storage voltage line and the reference voltage line.

2. The liquid crystal display of claim 1, wherein the third switching element is connected to the gate line.

3. The liquid crystal display of claim 2, wherein the storage voltage line comprises:
   a first storage electrode overlapping the first subpixel electrode; and
   a second storage electrode overlapping the second subpixel electrode.

4. The liquid crystal display of claim 1, wherein the first signal compensation unit receives a reference voltage from the reference voltage line through the first connection line, and
   the first signal compensation unit applies a first compensation signal to the reference voltage line through the second connection line.

5. The liquid crystal display of claim 1, wherein the second signal compensation unit receives a storage voltage from the storage voltage line through the third connection line, and
   the second signal compensation unit applies a second compensation signal to the storage voltage line through the fourth connection line.

6. The liquid crystal display of claim 1, wherein the storage voltage line comprises:
   a first storage electrode overlapping the first subpixel electrode; and
   a second storage electrode overlapping the second subpixel electrode.

7. The liquid crystal display of claim 6, wherein the first signal compensation unit receives a reference voltage from the reference voltage line through the first connection line, and
   the first signal compensation unit applies a first compensation signal to the reference voltage line through the second connection line.

8. The liquid crystal display of claim 6, wherein the second signal compensation unit receives a storage voltage from the storage voltage line through the third connection line, and
   the second signal compensation unit applies a second compensation signal to the storage voltage line through the fourth connection line.

9. The liquid crystal display of claim 2, wherein the first signal compensation unit receives a reference voltage from the reference voltage line through the first connection line, and
   the first signal compensation unit applies a first compensation signal to the reference voltage line through the second connection line.

10. The liquid crystal display of claim 2, wherein the second signal compensation unit receives a storage voltage from the storage voltage line through the third connection line, and the second signal compensation unit applies a second compensation signal to the storage voltage line through the fourth connection line.

* * * * *